UNITED STATES PATENT OFFICE.

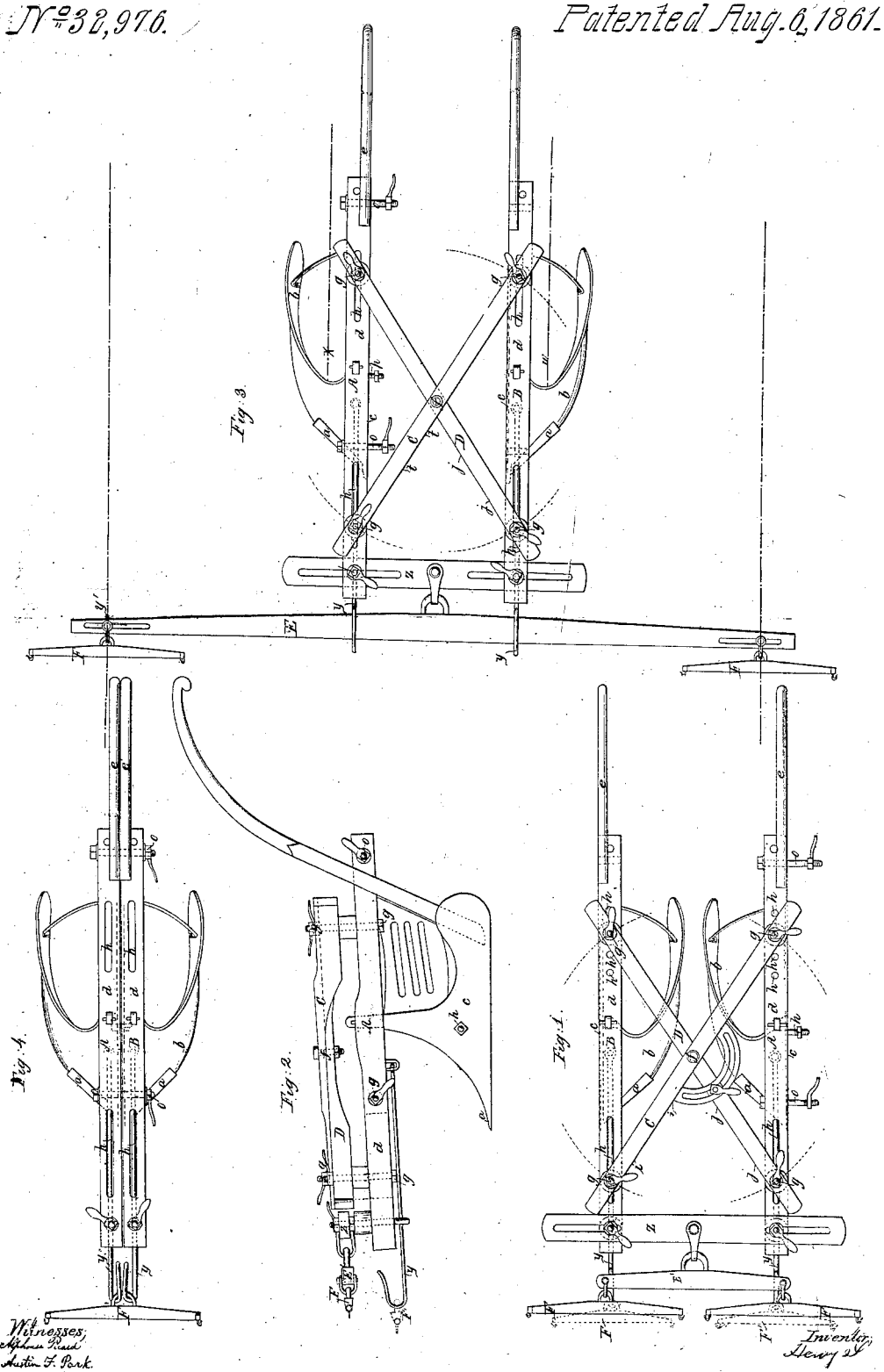

HENRY S. CHICHESTER, OF BRUNSWICK, NEW YORK.

IMPROVEMENT IN PLOWS.

Specification forming part of Letters Patent No. 32,976, dated August 6, 1861.

*To all whom it may concern:*

Be it known that I, HENRY S. CHICHESTER, of the town of Brunswick, in the county of Rensselaer and State of New York, have invented a certain new and Improved Changeable Double Plow; and I do hereby declare that the following is a full and exact description thereof, reference being had to the annexed two sheets of drawings, which make a part of this specification, and in which the same letters of reference indicate like parts in all the figures.

My improved double plow is primarily designed for use in simultaneously turning two furrows toward each other, so as to thereby hill up both sides of a row of growing corn or other plants or vegetables at one operation, by drawing the double plow along straddle of the row.

Figure 1 is a plan, and Fig. 2 a side elevation, of one of my improved double plows.

A is a single right-hand plow, and B is a similar left-hand plow, each having a share, $a$, mold-board $b$, landside $c$, draft-beam $d$, and handle $e$, all constructed and arranged and secured together, so that each of the plows A B is a complete implement in itself without the other, and capable of being used alone in plowing land and turning or marking separate furrows, the same as any single mold-board plow in common use.

My improved double plow consists of the two right and left plows A B, constructed as above described, and united together, but at a distance apart, with both the mold-boards $b\ b$ arranged on the inner side and opposite to each other by means of two distinct bars, C and D, crossed and pivoted together at their crossing-point $f$, and fastened, at places in the bars on opposite sides of and substantially equidistant from the pivot $f$, to the forward and rear parts of the plow-beams $d\ d$ by means of or by equivalent devices for the screw-bolts $g\ g\ g\ g$, extended through holes in the crossed bars and slots or perforations $h$ in the plow-beams, all essentially as shown or indicated by Figs. 1 and 2 of the annexed drawings.

The plows A and B are connected together sufficiently strong by means of the crossed and pivoted bars C D alone, as above described, without the aid of the bar $z$, to which the evener E or E' is shown attached in Figs. 1, 2, 3, 5, and 6; and I generally prefer to not have any bar $z$ nor evener E or E' on the plows, but to hitch the whiffletrees F F directly to the clevis or draw-rod $y$ on each plow A B, substantially as indicated at F' in Figs. 1 and 2, and then cross the inside traces of the draft-animals to equalize the draft on the plows A and B.

In my improved double plow it is essential tha the crossed bars C D should be pivoted together at their crossing-point $f$, so as to thereby maintain the requisite parallelism and opposite positions of the plows A B under all circumstances; and in my improved double plow, composed of the two complete right and left plows A B and the pivoted crossed bars C D, constructed and arranged and secured together as hereinbefore described, the forward inwardly-inclined sides $i\ i\ j\ j$ of the holding-bars C D themselves serve to collect together the spreading tops of the plants just as the earth is being turned up against the plants on both sides by the mold-boards $b\ b;$ and the whole apparatus can be adjusted to cut the two furrows and turn up the earth closer to or farther from both sides of the row of plants, as may be required, by simply fastening the crossed bars C D at different places on the plow-beams, without changing the position of either the share $a$ or the mold-board $b$ of either plow in respect to its beam $d$, so that my improved double plow may at all times be changed into two efficient single plows by merely taking off the parts by which the beams of the plows are fastened to each other.

Fig. 3 is a plan of a double plow for simultaneously turning two separate furrows outward instead of inward; and my improved double plow shown in Fig. 1 may be changed into a double plow like that shown in Fig. 3 by simply putting and securing each of the right and left plows A B in the place of the other; and when my improved double plow shown in Fig. 1 is changed into one like that shown in Fig. 3 it may then be converted into a potato-digger, such as is shown in plan by Fig. 5 on Sheet II and in sectional elevation in Fig. 6, by securing a scooping perforated platform and apron, G H, Fig. 7, between and to the plows A B by means of an axis, $k$, and adjustable hangers I I, in the manner shown by those drawings; and my improved double plow shown in Fig. 1 may be changed into a double-mold-board plow, such as is shown in plan by Fig. 4, by simply removing the crossed bars C D and the bar z, when used, and then fastening the plows A B together, landside to landside, by means of screw-bolts o o p, as indicated by the annexed drawings.

I am aware that a right-hand plow or share and a left-hand one have been secured together with the two shares opposite to each other and capable of being set at various distances apart, and so as to simultaneously turn two separate furrows either both inward or both outward, and that a potato-digging scoop has been arranged and secured in an inclined position between and to two right and left shares; and I believe that a double mold-board plow has been heretofore so constructed that it could also be used as a single-mold-board plow, and that cross-braces have been arranged in combination with two beams and movable shares in the construction of cultivators; and I do not claim any of those features; but I do not know or believe that any implement has ever before been composed of two complete right and left plows, A B, and two crossed bars, C D, pivoted together at their crossing-point $f$, and all constructed and arranged and secured together as hereinbefore described, and shown by Figs. 1 and 2 of the annexed drawings, so as to be capable of all the alterations hereinbefore specified as appertaining to my improved changeable double plow.

What I claim as new and of my invention, and desire to secure by Letters Patent, is—

The combination and arrangement of the crossed bars C and D, pivoted together at their crossing-point $f$, with the right and left plows A and B, so as to constitute an implement for simultaneously hilling up both sides of a row of corn, as herein described, the same being capable of alteration into two separate single mold-board plows, or a double mold-board plow, or a plow for simultaneously turning two separate furrows outward, or a potato-digging plow, as herein set forth.

HENRY S. CHICHESTER.

Witnesses:
THOMAS F. MORAN,
AUSTIN F. PARK.